Sept. 19, 1939.   J. H. LAWRENCE   2,173,690

FURNACE FLOOR

Filed Feb. 17, 1937

INVENTOR.
JOHN H LAWRENCE.
BY
ATTORNEYS

Patented Sept. 19, 1939

2,173,690

UNITED STATES PATENT OFFICE 2,173,690

FURNACE FLOOR

John H. Lawrence, Bronxville, N. Y., assignor to Metropolitan Engineering Company, Brooklyn, N. Y., a corporation of New York Application February 17, 1937, Serial No. 126,166

8 Claims. (Cl. 122—235)

In boiler furnaces of large size heated by powdered coal, the temperatures are very high and the considerable quantity of ash or mineral matter in the coal is sometimes disposed of by allowing it to run down the side walls and fall to the floor in the molten form. The slag accumulates to some extent and is partly or wholly run off in molten form. Such furnaces are known as slag bottom furnaces.

The present invention provides an improved construction of bottom for boiler furnaces of this type, being adapted in fact for use in other furnaces involving similar conditions.

The accompanying drawing illustrates embodiments of the invention.

Figure 1:
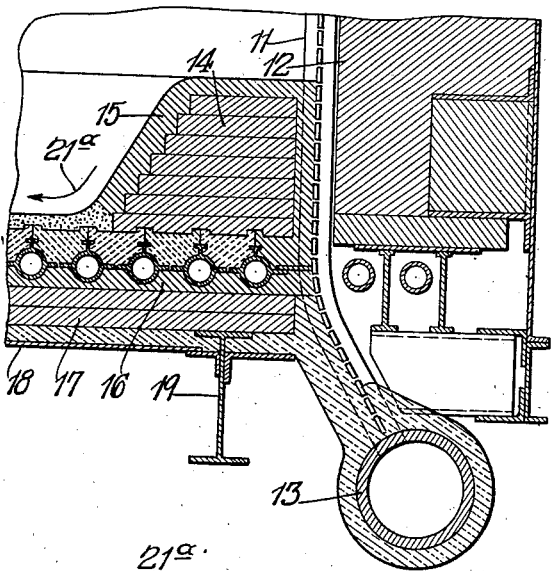
Figure 2:
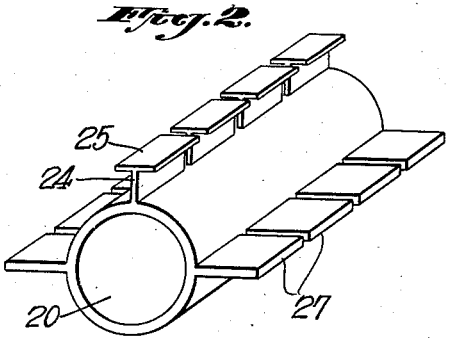
Figure 3:
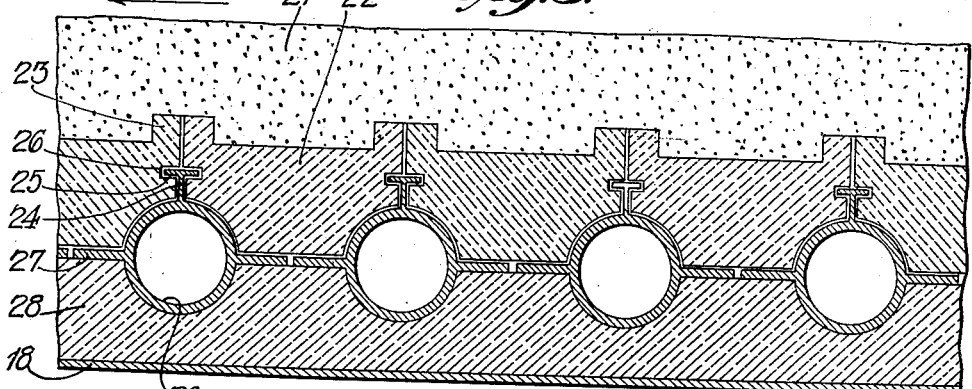
Figure 4:
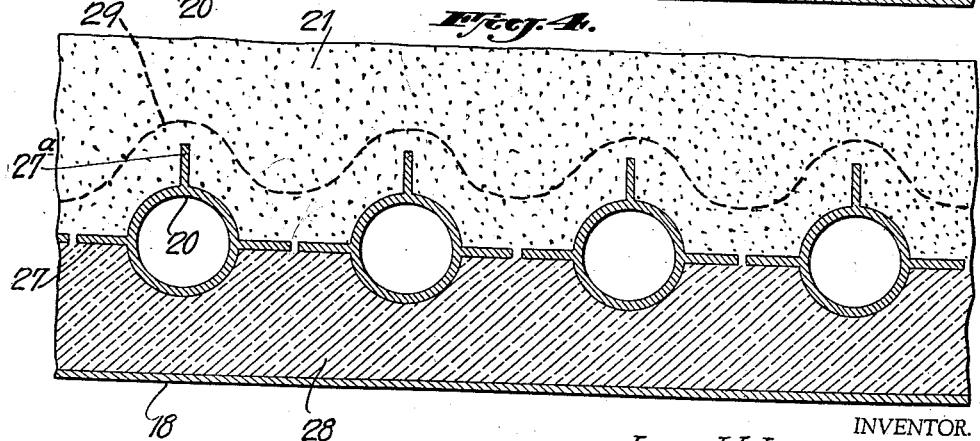

Fig. 1 is a vertical cross-section of one side of the floor of a furnace of the Murray water wall type; Fig. 2 is a perspective view of a portion of one of the tubes shown therein; Fig. 3 is an enlarged view of a portion of Fig. 1; Fig. 4 is a similar view of a modification.

The boiler illustrated in Fig. 1 has side walls made of upright fin tubes 11 on the outside of which is a refractory layer 12. At their lower ends the tubes communicate with a header 13. Throughout the major portion of their length the tubes constitute the exposed inner face of the wall. But at their lower ends they are covered on the inside with a shoulder built up of refractory brickwork 14 faced with refractory cement 15 and generally supported on a water-cooled structure 16 of plastic cement which in turn is supported by refractory bricks 17 and a metal shell 18 resting on beams 19 and other parts of the floor-supporting structure. The wall and corner construction may be of any other usual or suitable arrangement.

The floor between these corner shoulders is made up as shown on an enlarged scale in Fig. 3. The floor is cooled by means of water tubes 20 which may be connected into the circulation of the boiler so as to use the heat taken out of them by the passing water. The top surface of the floor is made of a mass 21 of chrome ore or similar material which is highly resistant to abrasion at high temperatures. Nevertheless, the flowing of the molten slag over the surface is fairly destructive. The slag is apt to contain a large percentage of iron and other metals which make it heavy. The molten slag tends to form grooves and cut deeply into the surface and destroy the cooling tubes 20 or other cooling means which may be imbedded in the floor.

According to this invention the tubes are protected from this destructive effect. The floor is sloped so that the molten slag flows across it from one side to the other before finding an outlet, or from the sides to an intermediate point in the width before finding a downward slag spout. The tubes extend across the principal direction of flow of the molten slag on the floor, shown by arrow 21ᵃ, Figs. 1 and 3.

In order to protect them from injury by slag streams which may cut deeply into the top layer, they are covered by refractory blocks 22 underlying the surface material 21. These blocks are provided with upright ridges 23 which extend across and interrupt such streams of molten slag. To hold them down in position they are hooked into engagement with the tubes. For this purpose the tubes are provided with upwardly extending pieces 24 of T-shape having their webs welded at one edge to the top of the tube and having flanges 25 which fit into grooves 26 formed in the meeting faces of the blocks 22. Each of these blocks spans the distance center-to-center between two tubes, leaving only enough clearance between them for the holding down devices 24. The central portions of the blocks are of reduced width and are shaped to fit freely between two tubes and to extend down to a level corresponding approximately with the level of the centers of the tubes.

Along this line the tubes are provided with fins 27 consisting of small strips of approximately rectangular shape and of about the thickness of the tube, welded along their edges to the tubes. These fins form a dividing plane between the upper and lower parts of a floor. They also stiffen the floor and they provide additional area of contact with the refractory material of the floor so as to increase their cooling effect as compared with that of bare tubes.

The strains induced in the welding of the T's and the fins to the tubes and those involved in differential expansion and contraction during use are reduced by making the T's 24, 25 and also the fins 27 in separate short pieces separately welded to the tube, as shown in Fig. 2, but preferably close enough to one another, in each line, to constitute in effect substantially a continuous metal structure.

The lower part of the floor, which supports the tubes, may be of any usual or suitable construction such, for example, as that illustrated in Fig. 1; or may be, as shown in Fig. 3, of a deeper mass of plastic insulation 28 in which the lower halves of the tubes are imbedded and on which the fins rest, with the metal plate 18 thereunder resting on the supporting beams or the like.

The fins 27 may be replaced by round rods or pins or by various other shapes. Various other hooked forms may also be substituted for the T's 24 for holding down and holding in register the refractory blocks 22; and plain fins or pins, in fact, may be substituted therefor.

In Fig. 4, for example, the tubes, otherwise the same as in Fig. 3, are provided on top with a line of fins 27ª which may be like the fins 27 of Fig. 3 and subject to the same variations in design. The refractory blocks of Fig. 3 may be used in this connection or blocks of different shape may be used or, as shown, such blocks may be omitted entirely, the required depth being made up entirely of the chrome ore or other refractory surface mass.

In this case the line of fins 27ª will serve to retard abrasion of the top mass 21 to a dangerous depth. Their cooling effect extends upward and laterally so as to produce and maintain parallel spaced ridges or dams of the refractory material having extra resistance to erosion, corresponding to those formed by the ridges 23 of Fig. 2. Such dams are indicated by the dotted line 29.

Various other modifications in detail may be made by those skilled in the art without departing from the invention as defined in the following claims.

What I claim is:

1. A floor for furnaces of the character described in which molten slag accumulates or runs over the bottom in a certain direction, said floor comprising a surface layer beneath which are cooling tubes extending across said direction and means above the tubes projecting into said surface layer and extending lengthwise of said tubes to provide extra resistance to abrasion by the molten slag at spaced intervals in its direction of flow.

2. A floor for furnaces of the character described in which molten slag accumulates or runs over the bottom, said floor comprising a surface layer beneath which are cooling tubes and ridges including metallic projections above the tubes located along spaced lines transverse to the flow of the molten slag providing extra resistance to erosion thereby.

3. A floor for furnaces of the character described in which molten slag accumulates or runs over the bottom, said floor comprising a surface layer which is subject to erosion by the slag and beneath which are cooling tubes and means below the surface providing extra resistance to abrasion by the molten slag, said means comprising metal projections extending upward from the tubes.

4. A floor for furnaces of the character described in which molten slag accumulates or runs over the bottom, said floor comprising a surface layer beneath which are cooling tubes and means above the tubes providing extra resistance to abrasion by the molten slag, said means comprising metal projections extending upward from the tube and molded blocks with which such projections are engaged.

5. A floor for furnaces of the character described in which molten slag accumulates or runs over the bottom, said floor comprising a surface layer of refractory material beneath which are cooling tubes, said tubes being provided with fins forming extended surfaces thereon in contact with the refractory material so as to provide additional cooling surface and increase the resistance of the refractory to abrasion by the molten slag, said fins extending upward into the refractory material above the tubes.

6. A floor for furnaces of the character described in which molten slag accumulates or runs over the bottom, said floor comprising a surface layer of refractory material beneath which are cooling tubes, said tubes being provided with fins forming extended surfaces thereon in contact with the refractory material so as to provide additional cooling surface and increase the resistance of the refractory to abrasion by the molten slag, said fins extending upward into the refractory material above the tubes and having hooked engagement with the refractory so as to oppose any lifting tendency.

7. A floor for furnaces of the character described in which molten slag accumulates or runs over the bottom, said floor comprising a surface layer of refractory material beneath which are cooling tubes, said tubes being provided with fins forming extended surfaces thereon in contact with the refractory material so as to provide additional cooling surface and increase the resistance of the refractory to abrasion by the molten slag, said fins being in separate short pieces separately welded to the tube.

8. A floor for furnaces of the character described in which molten slag accumulates or runs over the bottom, said floor comprising a surface layer of refractory material beneath which are cooling tubes, said tubes being provided with fins forming extended surfaces thereon in contact with the refractory material so as to provide additional cooling surface and increase the resistance of the refractory to abrasion by the molten slag, said fin being in two horizontal lines located between the tubes and in a vertical line.

JOHN H. LAWRENCE.